(12) United States Patent
Holland et al.

(10) Patent No.: US 12,518,482 B2
(45) Date of Patent: Jan. 6, 2026

(54) VIRTUAL REPRESENTATIVE CONDITIONING SYSTEM

(71) Applicant: QUALCOMM Incorporated, San Diego, CA (US)

(72) Inventors: Wesley James Holland, Encinitas, CA (US); Ziad Asghar, San Diego, CA (US); Daniel Jared Sinder, San Diego, CA (US); Khaled Helmi El-Maleh, San Marcos, CA (US); Vikram Gupta, San Diego, CA (US); Seyfullah Halit Oguz, San Diego, CA (US); Miran Chun, San Diego, CA (US); Fatih Murat Porikli, San Diego, CA (US); Jian Shen, San Diego, CA (US); Vinesh Sukumar, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 18/447,963

(22) Filed: Aug. 10, 2023

(65) Prior Publication Data
US 2025/0054230 A1 Feb. 13, 2025

(51) Int. Cl.
| G06T 17/00 | (2006.01) |
| G06T 13/20 | (2011.01) |
| G06T 13/40 | (2011.01) |

(52) U.S. Cl.
CPC ............ *G06T 17/00* (2013.01); *G06T 13/205* (2013.01); *G06T 13/40* (2013.01)

(58) Field of Classification Search
CPC ...... H04N 7/157; G06N 3/006; G06F 16/437; G06F 16/436; G06T 13/40; G06T 13/205; G06T 17/00
See application file for complete search history.

(56) References Cited

U.S. PATENT DOCUMENTS 7,464,132 B1* 12/2008 Florissi ............... H04L 41/0843
709/200
2001/0026272 A1* 10/2001 Feld ....................... A41H 3/007
345/585

(Continued)

FOREIGN PATENT DOCUMENTS

| CN | 113822970 A | 12/2021 |
| EP | 4220565 A1 | 8/2023 |

OTHER PUBLICATIONS

International Search Report and Written Opinion—PCT/US2024/040988—ISA/EPO—Nov. 13, 2024.

*Primary Examiner* — Kee M Tung
*Assistant Examiner* — Nauman U Ahmad
(74) *Attorney, Agent, or Firm* — QUALCOMM Incorporated

(57) ABSTRACT

Systems and techniques are provided for conditioning virtual representatives. For example, a method can include obtaining, by a conditioning engine, a baseline model for a virtual representative; obtaining, by the conditioning engine, one or more conditioning inputs configured to condition an action in one or more multi-user experiences of the virtual representative; generating, based on the baseline model and the one or more conditioning inputs configured to condition an action in one or more multi-user experiences of the virtual representative, a conditioned model for the virtual representative; and outputting the conditioned model for the virtual representative.

39 Claims, 6 Drawing Sheets

(56) References Cited

U.S. PATENT DOCUMENTS

| | | | |
|---|---|---|---|
| 2011/0208841 A1* | 8/2011 | Robertson | G06F 15/177 |
| | | | 709/220 |
| 2012/0158589 A1* | 6/2012 | Katzin | G06Q 20/22 |
| | | | 705/44 |
| 2014/0198121 A1* | 7/2014 | Tong | G06T 11/60 |
| | | | 345/581 |
| 2020/0137230 A1* | 4/2020 | Spohrer | H04M 7/0027 |
| 2022/0379170 A1 | 12/2022 | Menaker et al. | |
| 2024/0221062 A1* | 7/2024 | Iddon | G06Q 50/01 |
| 2024/0221270 A1* | 7/2024 | Leyton | A63F 13/92 |
| 2024/0303891 A1* | 9/2024 | McIntyre-Kirwin | |
| | | | G06T 13/205 |

\* cited by examiner

VIRTUAL REPRESENTATIVE CONDITIONING SYSTEM

FIELD

The present disclosure is related to virtual representatives. In some examples, aspects of the present disclosure are related to systems and techniques for providing conditioned virtual representatives for multi-user experiences.

BACKGROUND

An extended reality (XR) (e.g., virtual reality, augmented reality, mixed reality) system can provide a user with a virtual experience by immersing the user in a completely virtual environment (made up of virtual content) and/or can provide the user with an augmented or mixed reality experience by combining a real-world or physical environment with a virtual environment.

One example use case for XR content that provides virtual, augmented, or mixed reality to users is to present a user with a "metaverse" experience. The metaverse is essentially a virtual universe that includes one or more three-dimensional (3D) virtual worlds. For example, a metaverse virtual environment may allow a user to virtually interact with other users (e.g., in a social setting, in a virtual meeting, etc.), to virtually shop for goods, services, property, or other item, to play computer games, and/or to experience other services.

Machine learning models (e.g., deep learning models such as neural networks) can be used to perform a variety of tasks, including natural language processing (NLP), image processing, audio processing, depth estimation, detection and/or recognition (e.g., scene or object detection and/or recognition), pose estimation, image reconstruction, classification, three-dimensional (3D) modeling, dense regression tasks, data compression and/or decompression, image processing, among other tasks. Machine learning models can be versatile and can achieve high quality results in a variety of tasks.

BRIEF SUMMARY

In some examples, systems and techniques are described for conditioning virtual representatives for multi-user experiences. According to at least one illustrative example, a method is provided for conditioning virtual representatives. The method includes: obtaining, by a conditioning engine, a baseline model for a virtual representative; obtaining, by the conditioning engine, one or more conditioning inputs configured to condition an action in one or more multi-user experiences of the virtual representative; generating, basing on the baseline model and the one or more conditioning inputs configured to condition an action in one or more multi-user experiences of the virtual representative, a conditioned model for the virtual representative; and outputting the conditioned model for the virtual representative.

In another example, an apparatus for conditioning virtual representatives is provided that includes at least one memory and at least one processor coupled to the at least one memory. The at least one processor is configured to: obtain, by a conditioning engine, a baseline model for a virtual representative; obtain, by the conditioning engine, one or more conditioning inputs configured to condition an action in one or more multi-user experiences of the virtual representative; generate, based on the baseline model and the one or more conditioning inputs configured to condition an action in one or more multi-user experiences of the virtual representative, a conditioned model for the virtual representative; and output the conditioned model for the virtual representative.

In another example, a non-transitory computer-readable medium is provided that has stored thereon instructions that, when executed by one or more processors, cause the one or more processors to: obtain, by a conditioning engine, a baseline model for a virtual representative; obtain, by the conditioning engine, one or more conditioning inputs configured to condition an action in one or more multi-user experiences of the virtual representative; generate, based on the baseline model and the one or more conditioning inputs configured to condition an action in one or more multi-user experiences of the virtual representative, a conditioned model for the virtual representative; and output the conditioned model for the virtual representative.

In another example, an apparatus for conditioning virtual representatives is provided. The apparatus includes: means for obtaining, by a conditioning engine, a baseline model for a virtual representative; means for obtaining, by the conditioning engine, one or more conditioning inputs configured to condition an action in one or more multi-user experiences of the virtual representative; means for generating, basing on the baseline model and the one or more conditioning inputs configured to condition an action in one or more multi-user experiences of the virtual representative, a conditioned model for the virtual representative; and means for outputting the conditioned model for the virtual representative.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
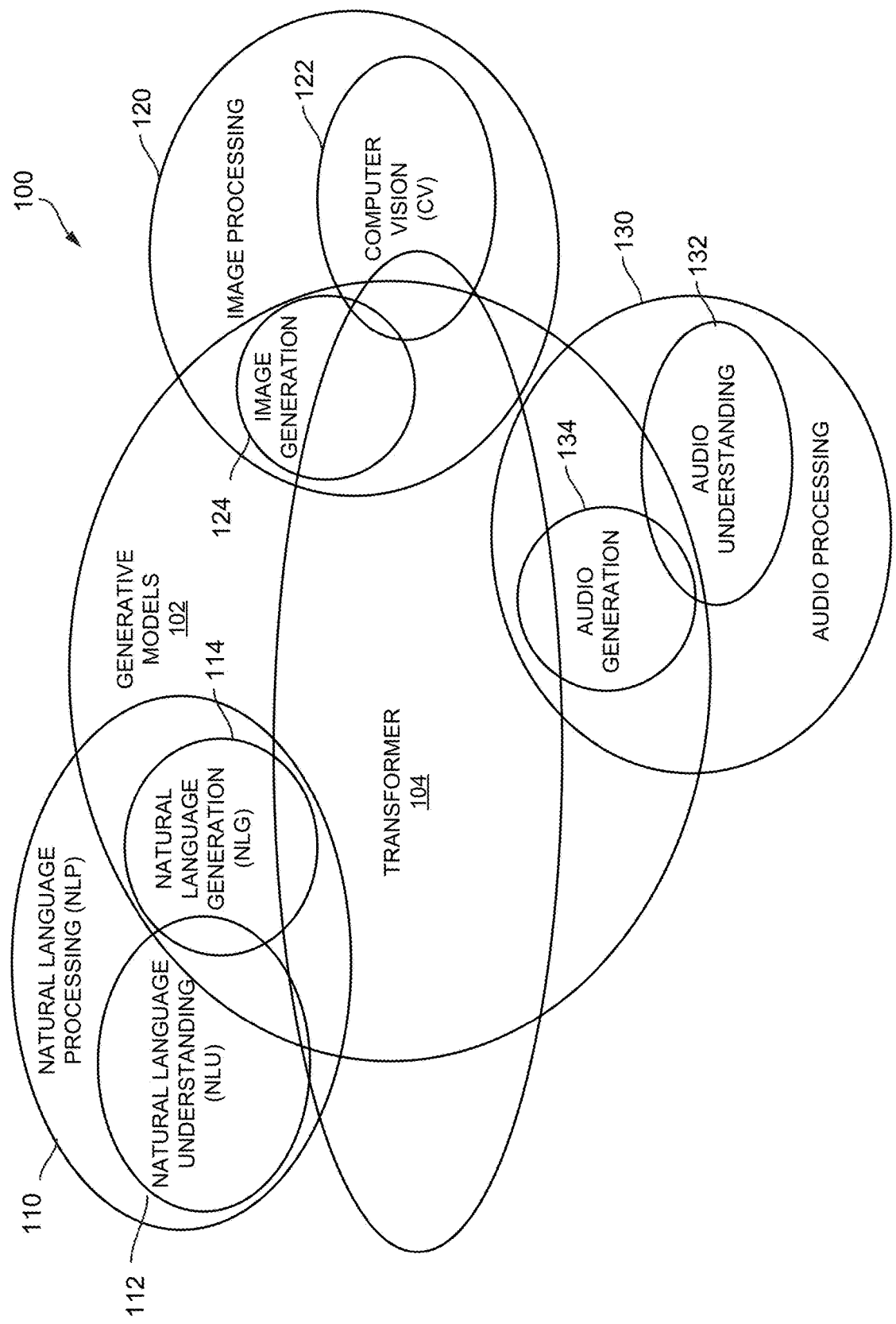
FIG. 1 is a diagram illustrating example relationships between machine learning tasks and various categories of neutral networks, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

As noted previously, an extended reality (XR) system or device can provide a user with an XR experience by presenting virtual content to the user (e.g., for a completely immersive experience) and/or can combine a view of a real-world or physical environment with a display of a virtual environment (made up of virtual content). The real-world environment can include real-world objects (also referred to as physical objects), such as people, vehicles, buildings, tables, chairs, and/or other real-world or physical objects. As used herein, the terms XR system and XR device are used interchangeably. Examples of XR systems or devices include head-mounted displays (HMDs), smart glasses (e.g., AR glasses, MR glasses, etc.), among others.

XR systems can include virtual reality (VR) systems facilitating interactions with VR environments, augmented reality (AR) systems facilitating interactions with AR environments, mixed reality (MR) systems facilitating interactions with MR environments, and/or other XR systems. For instance, VR provides a complete immersive experience in a three-dimensional (3D) computer-generated VR environment or video depicting a virtual version of a real-world environment. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

AR is a technology that provides virtual or computer-generated content (referred to as AR content) over the user's view of a physical, real-world scene or environment. AR content can include any virtual content, such as video, images, graphic content, location data (e.g., global positioning system (GPS) data or other location data), sounds, any combination thereof, and/or other augmented content. An AR system is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

MR technologies can combine aspects of VR and AR to provide an immersive experience for a user. For example, in an MR environment, real-world and computer-generated objects can interact (e.g., a real person can interact with a virtual person as if the virtual person were a real person).

An XR environment can be interacted with in a seemingly real or physical way. As a user experiencing an XR environment (e.g., an immersive VR environment) moves in the real world, rendered virtual content (e.g., images rendered in a virtual environment in a VR experience) also changes, giving the user the perception that the user is moving within the XR environment. For example, a user can turn left or right, look up or down, and/or move forwards or backwards, thus changing the user's point of view of the XR environment. The XR content presented to the user can change accordingly, so that the user's experience in the XR environment is as seamless as it would be in the real world.

In some cases, an XR system can match the relative pose and movement of objects and devices in the physical world. For example, an XR system can use tracking information to calculate the relative pose of devices, objects, and/or features of the real-world environment in order to match the relative position and movement of the devices, objects, and/or the real-world environment. In some examples, the XR system can use the pose and movement of one or more devices, objects, and/or the real-world environment to render content relative to the real-world environment in a convincing manner. The relative pose information can be used to match virtual content with the user's perceived motion and the spatio-temporal state of the devices, objects, and real-world environment. In some cases, an XR system can track parts of the user (e.g., a hand and/or fingertips of a user) to allow the user to interact with items of virtual content.

XR systems or devices can facilitate interaction with different types of XR environments (e.g., a user can use an XR system or device to interact with an XR environment). One example of an XR environment is a metaverse virtual environment. A user may participate in one or more virtual gatherings with other users by virtually interacting with other users (e.g., in a social setting, in a virtual meeting, etc.), virtually shopping for items (e.g., goods, services, property, etc.), virtually playing computer games, and/or experiencing other services in a metaverse virtual environment. In one illustrative example, a virtual session provided by an XR system may include a 3D collaborative virtual environment for a group of users. The users may interact with one another via virtual avatars of the users in the virtual environment. The users may visually, audibly, haptically, or otherwise experience the virtual environment while interacting with virtual avatars of the other users.

A virtual avatar of a user may be used to represent the user in a virtual environment. An avatar representing a user may mimic an appearance, movement, mannerisms, and/or other features of the user. A virtual avatar may be generated/animated in real-time based on captured input from users devices. Avatars may range from basic synthetic 3D representations to more realistic representations of the user. In some examples, the user may desire that the avatar representing the person in the virtual environment appear as a digital twin of the user. In any virtual environment, it is important for an XR system to efficiently generate high-quality avatars (e.g., realistically representing the appearance, movement, etc. of the person) in a low-latency manner. It can also be important for the XR system to render audio in an effective manner to enhance the XR experience.

For instance, in the example of the 3D collaborative virtual environment from above, an XR system a user from the group of users may display virtual avatars of the other users sitting at specific locations at a virtual table or in a virtual room. The virtual representations of the users and the background of the virtual environment should be displayed in a realistic manner (e.g., as if the users were sitting together in the real world). The heads, bodies, arms, and hands of the users can be animated as the users move in the real world. Audio may need to be spatially rendered or may be rendered monophonically. Latency in rendering and animating the virtual representations should be minimal in order to maintain a high-quality user experience.

Machine learning systems (e.g., deep neural network systems or models) can be used to perform a variety of tasks such as, for example and without limitation, detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, audio processing, and image processing, among other tasks. Moreover, machine learning models can be versatile and can achieve high quality results in a variety of tasks.

Different types of neural networks exist, such as deep generative neural network models (e.g., generative pre-trained transformers (GPTs) generative adversarial network (GANs)), recurrent neural network (RNN) models, multi-layer perceptron (MLP) neural network models, convolutional neural network (CNN) models, among others.

FIG. 1 is a diagram 100 illustrating example relationships between machine learning tasks and various categories of neutral networks. In the example of FIG. 1, the largest oval represents a class of machine learning systems called generative models 102. As used herein, the term generative models 102 refers to models that are capable of generating new data instances. In some cases, generative models 102 can be implemented with different machine learning architectures. For example, as noted above, GANs and GPTs are examples of deep generative neural network models. In addition to generative models 102, there are classes of machine learning systems, such as discriminative models. As used herein, discriminative models are models that discriminate between different types of data instances.

FIG. 1 illustrates another large oval representing a transformer 104 neural network architecture. As illustrated in FIG. 1, the transformer 104 can be utilized as a generative model 102 (e.g., for performing generative tasks) and/or as a non-generative model (e.g., a discriminative model). In general, a transformer 104 is a deep learning model. A transformer typically performs self-attention (e.g., using at least one self-attention layer), differentially weighting the significance of each part of input (which includes the recursive output) data. Transformers can be used in many contexts, including the fields of natural language processing (NLP) 110, image processing 120, audio processing 130, or the like. Like recurrent neural networks (RNNs), transformers are designed to process sequential input data, such as natural language, with application to tasks such as translation and text summarization. However, unlike RNNs, transformers process the entire input all at once. The attention mechanism provides context for any position in the input sequence. For example, if the input data is a natural language sentence, the transformer does not have to process one word at a time. This allows for more parallelization than RNNs and therefore reduces training times. Compared to RNN models, transformers are more amenable to parallelization, allowing training on larger datasets.

As illustrated in FIG. 1, NLP can include both natural language understanding (NLU) 112 and natural language generation (NLG) 114. NLU 112 refers to understanding the meaning of written and/or spoken language (e.g., text, speech, or a combination thereof). Examples of the NLU 112 include text inference or email classification. NLG 114 refers to the task of producing written and/or spoken language (e.g., text, speech, or a combination thereof) from structured data, unstructured data, or a combination thereof. Examples of NLG 114 include query-focused summarization, story generation, news summarization, conversational artificial intelligence (AI), an auto-complete system or combinations thereof. In some examples, NLP systems may include a combination of NLU 112 and NLG 114, such as question answering, interpreting and then summarizing content (e.g., a news article or a story), or a combination thereof. In some examples, NLG 114 can include transformer 104 based NLG as illustrated in FIG. 1.

In some cases, image processing 120 can also include understanding and generation aspects. For example, as illustrated in FIG. 1, image processing 120 includes image understanding (e.g., computer vision (CV) 122), and image generation 124. In one illustrative example, image processing 120 may be used to generate images of virtual environments, personal avatars, or the like in an XR environment. Image processing 120 can include processing of individual images as well as sequences of image (e.g., sequential images in a video).

In another example, audio processing 130 can also include understanding and generation aspects. For example, as illustrated in FIG. 1, audio processing 130 includes audio understanding 132 and audio generation 134. For example, audio understanding 132 can be used to interpret audio data waveforms as words. Examples of audio generation 134 can include, synthesizing a voice (e.g., text to speech conversion), generating music, ambient sounds, and/or sound effects, or the like.

In some cases, multi-modal models (not shown) can incorporate and/or coordinate functionality between two or more different tasks. For example, a multi-modal model can incorporate any combination of NLP 110, image processing 120, and/or audio processing 130. In an illustrative example, a multi-modal model can receive audio data that contains a query, perform audio understanding 132 to generate a sequence of words (e.g., text) representing the query. In some examples, the sequence of words generated by audio understanding 132 can be an input to NLP 110, which can utilize NLU 112 to interpret the query and NLG 114 to generate an appropriate response. In some cases, a text response can be output from the NLG 114. In some implementations, audio generation 134 can convert the text response output from the NLG 114 into an audio response (e.g., a synthesized voice). In some implementations, image generation 124 can be used to generate an avatar (e.g., a 2D model, a 3D model, or the like) that can be displayed and coordinated with the output of the audio response generated by audio generation 134.

It should be understood that the examples of FIG. 1 are not meant to be limiting and are provided for the purposes of illustration only. Other types of machine learning models, neural network classes, neural network architectures, and/or any combination thereof that are not described herein can be used without departing from the scope of the present disclosure.

In some aspects, the availability of multi-user experiences in AR environments may allow for more opportunities for individuals to gather together as multi-user experience participants of a multi-user experience. In one illustrative example, a conference may occur in a VR multi-user experience environment that includes participants from multiple different continents. In some cases, a multi-user experience can allow the participants to navigate the environment to interact with particular participants (e.g., a colleague located in another city, state, or, country, a potential client, a software vendor, or the like). In some cases, businesses, social groups, or the like may increasingly conduct gatherings within multi-user experiences. For example, in some aspects, it may be preferable to conduct gatherings within multi-user experiences due to, without limitation, lack of schedule restrictions (e.g., due to coordinating travel, securing lodging), relative low cost, any other advantages and/or any combination thereof.

In some cases, an individual may wish to participate in a multi-user experience that they may not be able to attend. For example, a multi-user experience may conflict with an in-person gathering and/or one or more other multi-user experiences. In some cases, an individual may send a representative (e.g., a colleague, a friend, a family member) to attend a first gathering on their behalf (e.g., one of the multi-user experiences) while they attend a second gathering (e.g., the in-person gathering). However in some cases, the representative may not possess relevant background knowledge, full understanding of the purpose and/or context of the first gathering, adequate decision authority, one or more relevant skills, or the like. In addition, an individual may wish to attend three or more gatherings that occur at conflicting times. In some cases, the individual may not have enough representatives (e.g., colleagues, friends, family members, etc.) to attend all of the gatherings. In addition, sending a large number of representatives to different gatherings may consume a large amount of human resources for the benefit of one individual. In some cases, the individual may have to schedule debriefing sessions with each representative at different times based on availability, which may be time consuming and/or may be delayed relative to the gatherings. For example, if the individual and the representative attending the first gathering meet one week after the first gathering, the information may become stale, the representative's memory of the first gathering may diminish, or the like. In addition, in some cases, there may be privacy and/or security concerns associated with sending a representative to a gathering on the individual's behalf. For example, the individual may not wish for the representative to know sensitive information such as bank accounts, personal identity information, health information, or the like. As a result, the individual may sacrifice some or all of the benefits of participating in the first gathering by sending a representative. It would be advantageous for individuals to be able to have mechanisms for being represented at gatherings they are unable to attend.

Systems and techniques are described herein for conditioning virtual representatives for participation in a multi-user experience. For example, the systems and techniques can be used to condition one or more machine learning models (e.g., a generative model 102) as a virtual representative for a multi-user experience. For example, the systems and techniques can condition a baseline model (e.g., a pre-trained generative model) to represent the individual in a particular gathering. For example, the systems and techniques can condition a virtual representative by providing data to the virtual representative from a knowledge base. In some cases, the individual can select a subset of the information contained in the knowledge base that can be used to condition the virtual representative. In some cases, the systems and techniques can select data from the knowledge base for conditioning the virtual representative automatically. For example, if a virtual representative previously attended a meeting in a meeting series the systems and techniques can provide new information related to the meeting series, experience data (e.g., a video recording, a transcript, one or more tags, user insights) gathered during a previous meeting, feedback from the individual on the virtual representative's performance in a previous meeting, any other relevant information contained in the knowledge base, and/or any combination thereof as part of the conditioning process for the virtual representative. In some cases, systems and techniques can provide one or more directives from the individual for conditioning the virtual representative. For example, the individual may provide one or more text-based and/or audio prompts directing the behavior of the virtual representative. In some examples, the individual and the virtual representative can engage in a dialog as part of the conditioning process.

In some aspects, the systems and techniques can select which virtual representative will attend a particular multi-user experience from a collection of virtual representatives included in a representative bank. For example, the representative bank may include multiple virtual representatives with different baseline models and/or different conditioning. In some cases, the individual may select a representative from the representative bank to participate in a particular experience. In some aspects, the systems and techniques can select the virtual representative based on one or more experience parameters. For example, the systems and techniques may select a particular virtual representative based on an experience parameter indicating that the particular virtual representative attended one or more previous meetings in a meeting series. In some examples, the systems and techniques may select a particular virtual representative based on capability requirements for a multi-user experience indicated in the experience parameters. For example, a virtual representative with a multi-modal baseline model may be selected for a gathering that requires the use of 3D avatars for multi-user experience participants. In some cases, computational effort, memory use, power consumption, and/or latency can be reduced by re-using previously conditioned virtual representatives instead of requiring new conditioning every time a virtual representative is needed. For example, an operation of retrieving a particular virtual representative from a representative bank may require less computational effort, memory use, and/or power consumption and/or may be achieved with a lower latency than conditioning a baseline model.

In some cases, the systems and techniques can provide feedback to an individual regarding the gathering attended by the virtual representative. For example, the virtual representative may be configured to alert the individual when certain topics are discussed. In some aspects, the systems and techniques can provide a transcript and/or recording of the gathering for review during and/or after the gathering is completed.

Using the virtual representative conditioning systems and techniques described herein, an individual can benefit from participation in one or more gatherings without having to personally attend the gathering. In some cases, a conditioned virtual representative, conditioned to represent the individual in a specified manner at the gathering, can be selected to attend the gathering. In some examples, the individual can benefit from participation in the gathering by reviewing recordings, transcripts, and/or summaries of the gathering. In some cases, a conditioned virtual representative may be configured to collect more relevant data when compared to a virtual representative without conditioning. In some cases, by collecting more relevant data, the amount of memory required to store the data collected by the virtual representative can be reduced. In some cases, generating experience data based on participation of the virtual representative in a multi-user experience conditioned to collect more relevant data can be accomplished with less computational effort and/or power consumption.

Figure 2:
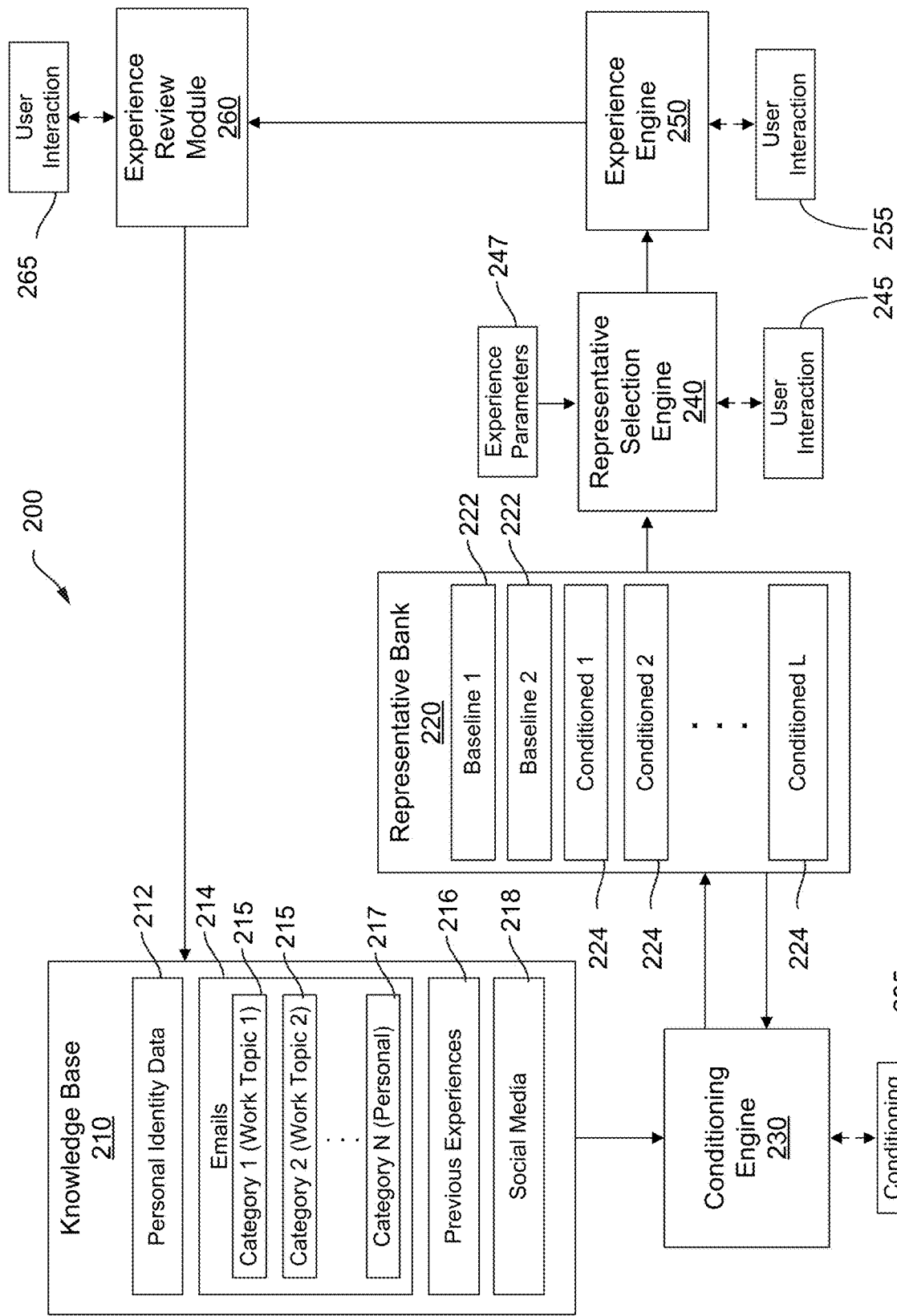
FIG. 2 is a block diagram illustrating an example of a virtual representative conditioning system, in accordance with some examples of the present disclosure.

Various aspects of the techniques described herein will be discussed below with respect to the figures. FIG. 2 illustrates an example virtual representative conditioning system 200. As illustrated, the virtual representative conditioning system 200 includes a knowledge base 210, a representative bank 220, a conditioning engine 230, a representative selection engine 240, an experience engine 250, and an experience review engine 260. The virtual representative conditioning system 200 can be configured to provide a conditioned model for a virtual representative that participates in a multi-user experience.

In some examples, the virtual representative conditioning system 200 can be and/or can be included in a mobile device or handset (e.g., a mobile telephone or so-called "smart phone" or other mobile device), a wearable device (e.g., a HMD, smart glasses), a wireless communication device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

In some examples, knowledge base 210 can include a plurality of sources of training data for training one or more virtual representative models. In some cases, conditioning data in the knowledge base 210 can be organized in categories. For example, the knowledge base data can include, without limitation, personal identity data 212 (e.g., name, age, nationality, languages spoken, favorite color, voice profile, facial shape and/or facial expression features, height, weight, eye color, any other data related to a specific individual, and/or any combination thereof), emails 214 (e.g., work emails 215, personal emails 217, any other category of emails, and/or any combination thereof), data collected from previous experiences 216 (e.g., one or more multi-user experiences attended by models of the conditioning engine 230), social media data 218, writings, recordings (e.g., audio and/or video), photographs, text messages, timelines, location history, personality test results, gait, facial expressions, any other data source, and/or any combination thereof. In some cases, the virtual representative conditioning system 200 can obtain data from personal interactions by a user and include personal interaction data in the knowledge base 210.

As illustrated in FIG. 2, the representative bank 220 can include a selection of baseline models 222 that can be trained with baseline training data sets. In one illustrative example, one or more of the baseline models 222 can include large language models trained with a baseline training data set that includes large quantities of text data. In some cases, based on one or more baseline training data sets, the baseline models 222 can learn to understand and respond to queries to be able to understand and/or respond to queries. In some examples, the baseline models 222 and/or conditioned models 224 included in the representative bank 220 can be implemented as DNNs. For example, the conditioned models 224 can include, without limitation, generative models 102, NLP 110 (e.g., NLU 112 and/or NLG 114), image processing 120 (e.g., computer vision (CV) 122 and/or image generation 124), audio processing 130, (e.g., audio understanding 132 and/or audio generation 134), and/or multi-modal models of FIG. 1, any other neural network architecture, and/or any combination thereof.

In some cases, the representative bank 220 can include a selection of conditioned model 224 that can include baseline models 222 conditioned with conditioning data. In the illustrated example of FIG. 2, representative bank 220 can obtain conditioning data from the knowledge base 210. In some cases, one or more conditioning data (e.g., data selected from the knowledge base 210) can be used to condition each of the two or more conditioned models 224. In some cases, the conditioning data provided to each model of the two or more conditioned models 224 can differ. For example, a first conditioned model 224 from representative bank 220 may be trained with personal identity data 212, work emails 215, and social media data 218 from the knowledge base 210. As another example, a second conditioned model 224 from the representative bank 220 may be trained with conditioning data that includes personal identity data 212, photographs and data from previous experiences 216. In some cases, the conditioning data used to train two or more conditioned models 224 from the knowledge base 210 may not share any conditioning data in common. In some cases, two or more conditioned models 224 from the knowledge base 210 may share some conditioning data in common in addition to being trained with some different conditioning data.

In some cases, two or more conditioned models 224 of the representative bank 220 can be trained to have similar areas of expertise. In some examples, a first conditioned model 224 can be trained with a superset of conditioning data relative to a second conditioned model 224. In one illustrative example, the first conditioned model 224 can be trained with personal identity data 212, a specific category of work emails 215, text messages, photographs, videos, and audio data. In the illustrative example, the second conditioned model 224 can be trained with the same personal identity data 212, the same specific category of work emails 215, and text messages. For example, the first conditioned model 224 can include a multi-modal model that is trained to produce a three-dimensional avatar in a multi-user experiences related to the specific category of work emails 215. In some cases, the second conditioned model 224 can include a text-based model that is trained to conduct text-based conversations (e.g., NLP 110 of FIG. 1) related to the same specific category of work emails 215. In some cases, where only text interactions are needed for a particular multi-user experience (e.g., a text-based chat program), second conditioned model 224 may provide similar functionality in the multi-user experience as the first conditioned model 224 while requiring less data storage (e.g., in cache 612, memory 615, ROM 620, RAM 625, storage device 630 of FIG. 6), less computational effort (e.g., by processor 610 of FIG. 6), and/or less power consumption. In some cases, the second conditioned model and/or the actions of the second conditioned model can be referred to as having a tailored functionality.

In some cases, the systems and techniques can condition a virtual representative with background information relevant to the purpose of the gathering. For example, a knowledge base may include a collection of emails discussing the subject of the gathering (e.g., a thread of emails related to a particular project). In one illustrative subject, the collection of emails may be used to condition the virtual representative by providing context related to the particular project. For example, context that may be included in knowledge base data (e.g., a collection of emails) may include, without limitation, topics have been previously discussed, previous agreements and/or disagreements, lists of incomplete and/or completed tasks, hot topics, project assignments, any other context relevant to the particular project, and/or any combination thereof. In some cases, the collection of emails may also inform the virtual representative of the individual's communication style with one or more other participants in the gathering. For example, the collection of emails may indicate whether the individual is humorous, serious, stern, cooperative, agreeable, disagreeable, whether the individual provides long or short responses to various types of questions, levels of authority between participants in the gathering, any other indications of the individuals' communication style, and/or any combination thereof. In some cases, the background information (e.g., the collection of emails and/or any other information in the knowledge base 210) may be used to condition the virtual representative to improve data relevance for data analytics and/or processing by the individual.

As illustrated in FIG. 2, conditioning engine 230 can obtain models (e.g., baseline models 222, conditioned model 224) from the representative bank 220 and/or conditioning data from the knowledge base 210. In some cases, the conditioning engine 230 can obtain conditioning input 235. In some cases, conditioning input 235 can include one or more directives from and individual for conditioning the conditioned model. For example, the individual may provide one or more text-based and/or audio prompts directing the behavior of a virtual representative. In some examples, the individual and the virtual representative can engage in a dialog as part of the conditioning input 235. In some cases, conditioning input 235 can include prompts to control the capabilities of the conditioned model. For example, the conditioned model may be prompted to limit the complexity of mathematical calculations, avoid using technical jargon, limit the scope of discussion relative to the total knowledge contained in the baseline mode, any other prompt for controlling the capabilities of the conditioned model, and/or any combination thereof. In some cases, the conditioning input 235 can enumerate the limitations of the authority of the conditioned model to act autonomously. For example, a conditioned model may be directed not to make any agreements with a value greater than $100, not to discuss salary decisions, not to terminate any individual's employer, any other limitation of authority, and/or any combination thereof. As another example, conditioning input 235 can include one or more instructions to slow the rate of speech, increase speaking volume, or the like. In some cases, dialog included in the conditioning input 235 can include queries by the model being conditioned regarding conditioning data from the knowledge base 210.

In some aspects, the model being conditioned may inquire why a user responded to an email in a particular way, and/or why a certain personal interaction resulted in an undesirable outcome. For example, while ingesting the conditioning data, the model being conditioned may generate responses to email questions and/or a conversation included in the conditioning data and one or more generated responses may differ from the actual response contained in the conditioning data. In some cases, the conditioning input 235 can be used to clarify why a particular response was chosen and/or can be used to improve the accuracy of the responses by the conditioned model. In some cases, the model being conditioned may determine that the conditioning data includes an example of a negative outcome (e.g., a strong disagreement) and inquire how the user may have acted differently to obtain a better outcome. In some case, the user's response can be used as additional conditioning data.

In some cases, the conditioning engine 230 can provide the conditioning inputs to the selected baseline model 222 to generate a conditioned model. In some cases, the conditioning engine 230 can apply additional conditioning to a previously conditioned model (e.g., conditioned model 224). For example, as a conditioned model 224 participates in multi-user experiences, experience data and/or user feedback can be used to perform additional conditioning of a conditioned model 224.

In the example of FIG. 2, representative selection engine 240 can select between available conditioned models in the representative bank 220 for a virtual representative participating in a multi-user experience. For example, when a virtual representative is requested for a multi-user experience, one or more experience parameters 247 can be provided to representative selection engine 240 for selecting between available models from the representative bank 220. In some examples, selection of a conditioned model for the virtual representative can be manual. In some cases, the representative selection engine 240 can obtain manual selection from user interaction 245. In some cases, user interaction 245 can include prompts provided to the representative selection engine 240. In some cases, user interaction 245 can include a dialog between the virtual representative conditioning system 200 and a user, similar to the conditioning input 235. For example, a user may be provided with a list of available conditioned models and may select a particular conditioned model from the representative bank 220 using a user interface. In some aspects, selecting a conditioned model for the virtual representative can be automated. For example, automated selection of a conditioned model for the virtual representative can be based on data from previous multi-user experience attended by each model, comparison between the experience parameters 247 and the conditioning data used to condition each condition model, any/other selection criteria, and/or any combination thereof. In some case, the selection process can be a combination of manual and automatic selection. For example, the user interaction 245 can include an instruction to exclude a specific conditioned model 224 from consideration by the automated selection.

As illustrated, experience engine 250 can receive a conditioned model 224 selected by the representative selection engine 240 and the experience engine 250 can facilitate participation in the multi-user experience by the virtual representative. In some cases, a user can interact with conditioned model for the virtual representative during the multi-user experience as illustrated by user interaction 255. For example, the experience engine 250 may notify a user that a sensitive topic is being discussed in the multi-user experience, a dispute is occurring, and/or a user authorization is required to perform a particular action. In some cases, the user may provide supplemental instructions to the conditioned model for the virtual representative on how to respond (e.g., change the topic, agree only if specified conditions are met, diffuse the dispute, etc.).

In some cases, after the conditioned model for the virtual representative participates in the multi-user experience, experience review engine 260 can generate experience data based on participation of the virtual representative in the multi-user experience. For example, the experience data can include a recording, a transcript, or a summary of the multi-user experience. In some cases, a user can provide feedback to the systems and techniques to indicate where the conditioned model for the virtual representative performed well or performed poorly, highlight important topics, or the like. In some cases, the experience data and/or user feedback can be incorporated as potential conditioning data in the knowledge base. In some cases, including the experience data and/or user feedback as conditioning data can improve performance of the conditioned model for the virtual representative in future multi-user experiences. In some cases, the experience review engine 260 can engage in a dialog with a user as illustrated by user interaction 265.

As noted above, the virtual representative conditioning system 200 and related techniques described herein can provide one or more conditioned virtual representatives for participating in multi-user experiences. For instance, an individual may wish to participate in a multi-user experience (e.g., a meeting, social gathering, etc.) but may be unable to personally attend. In some cases, the virtual representative conditioning system 200 can provide a conditioned model that is personalized based on conditioning data. In some cases, the conditioning data can be provided to the conditioned model to allow the conditioned model to emulate the appearance of the individual. In some cases, the conditioning data can provide background information and/or context for a particular topic that may be relevant to participation in a multi-user experience (e.g., a meeting). In some cases, conditioned models for a virtual representative can be stored in a representative bank. In some cases, when a virtual representative is requested for a multi-user experience, one or more experience parameters can be provided to a representative selection engine for selecting between available models from the representative bank. In some examples, selection of the conditioned model for the virtual representative can be manual. In some aspects, selecting a conditioned model for the virtual representative can be automated. For example, automated selection of a conditioned model for the virtual representative can be based on data from previous multi-user experience attended by each model, comparison between the experience parameters and the conditioning data used to condition each condition model, any/other selection criteria, and/or any combination thereof.

In some cases, using the systems and techniques, the selected conditioned model for the virtual representative can participate in the multi-user experience. In some cases, a user can interact with conditioned model for the virtual representative during the multi-user experience. For example, the conditioned model for the virtual representative may notify a user that a sensitive topic is being discussed in the multi-user experience, a dispute is occurring, and/or a user authorization is required to perform a particular action. In some cases, the user may provide supplemental instructions to the conditioned model for the virtual representative on how to respond (e.g., change the topic, agree only if specified conditions are met, diffuse the dispute, etc.).

In some cases, after a conditioned model for the virtual representative participates in the multi-user experience, the systems and techniques can generate experience data based on participation of the virtual representative in the multi-user experience. For example, the experience data can include a recording, a transcript, or a summary of the multi-user experience. In some cases, a user can provide feedback to the systems and techniques to indicate where the conditioned model for the virtual representative performed well or performed poorly, highlight important topics, or the like. In some cases, the experience data and/or user feedback can be incorporated as potential conditioning data in the knowledge base. In some cases, including the experience data and/or user feedback as conditioning data can improve performance of the conditioned model for the virtual representative in future multi-user experiences.

Figure 3:
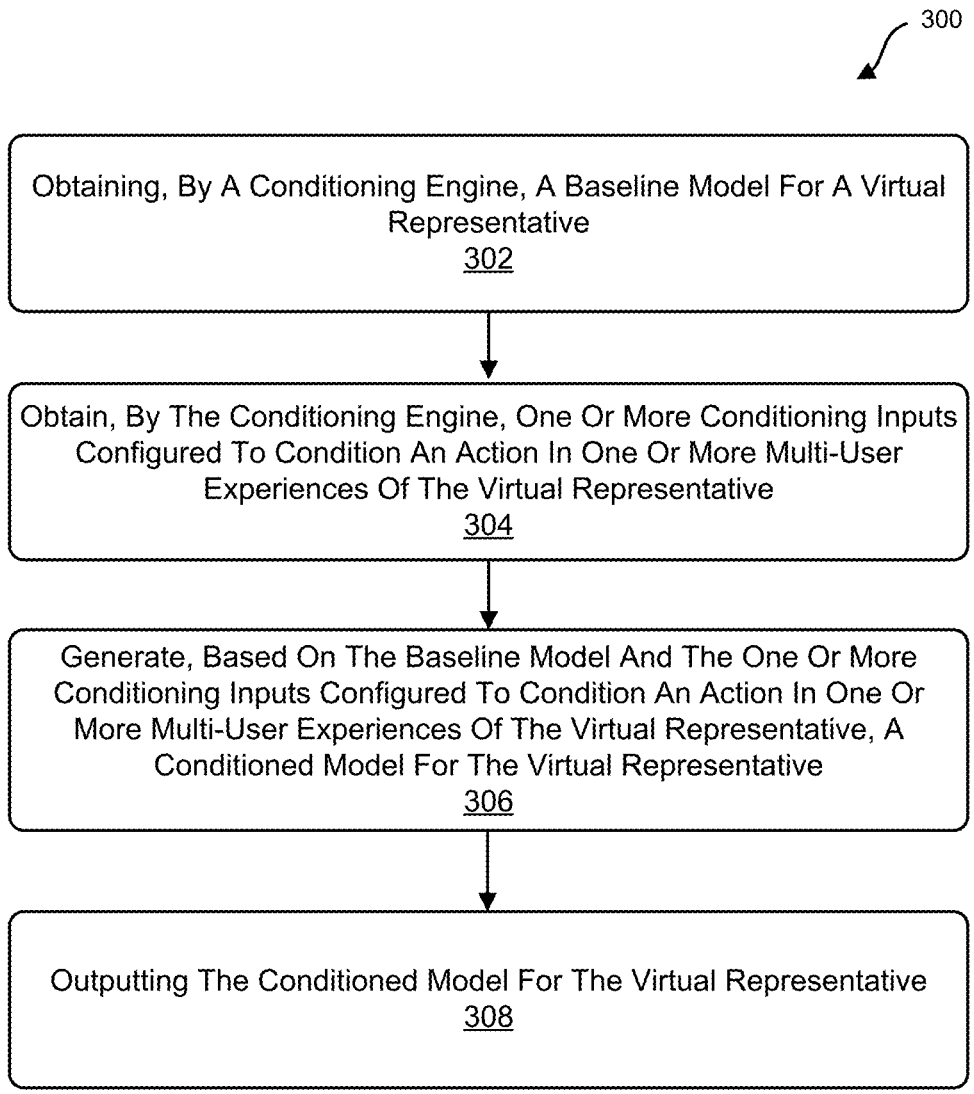
FIG. 3 is a flow diagram illustrating an example of a process for conditioning virtual representative, in accordance with some examples of the present disclosure.

FIG. 3 is a flow diagram illustrating an example of a process 300 of coordinating multi-user experiences. The process 300 and/or other process described herein can be performed by a computing device (or apparatus) or a component (e.g., a chipset, codec, etc.) of the computing device. The computing device may be an extended reality (XR) device (e.g., a virtual reality (VR) device or augmented reality (AR) device), a mobile device (e.g., a mobile phone), a network-connected wearable such as a watch, a vehicle or component or system of a vehicle, or other type of computing device. In one example, the process 300 and/or other process described herein can be performed by the virtual representative conditioning system 200 of FIG. 2. In another example, one or more of the processes can be performed by the computing system 600 shown in FIG. 6. For instance, a computing device with the computing system 600 shown in FIG. 6 can include the components of the virtual representative conditioning system 200 and can implement the operations of the process 300 of FIG. 3 and/or other process described herein.

Figure 4:
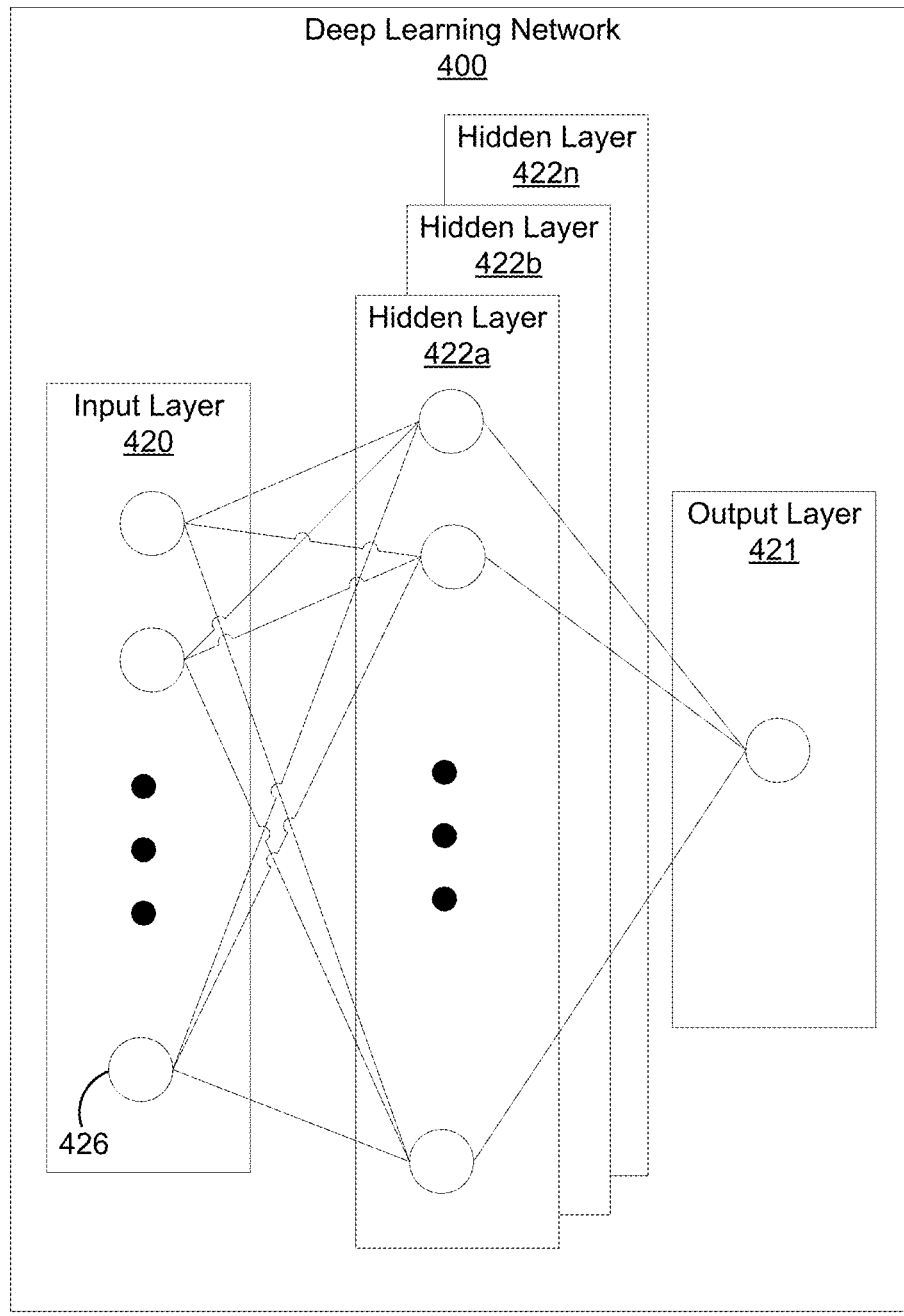
FIG. 4 is a block diagram illustrating an example of a deep learning network, in accordance with some examples of the present disclosure.
Figure 5:
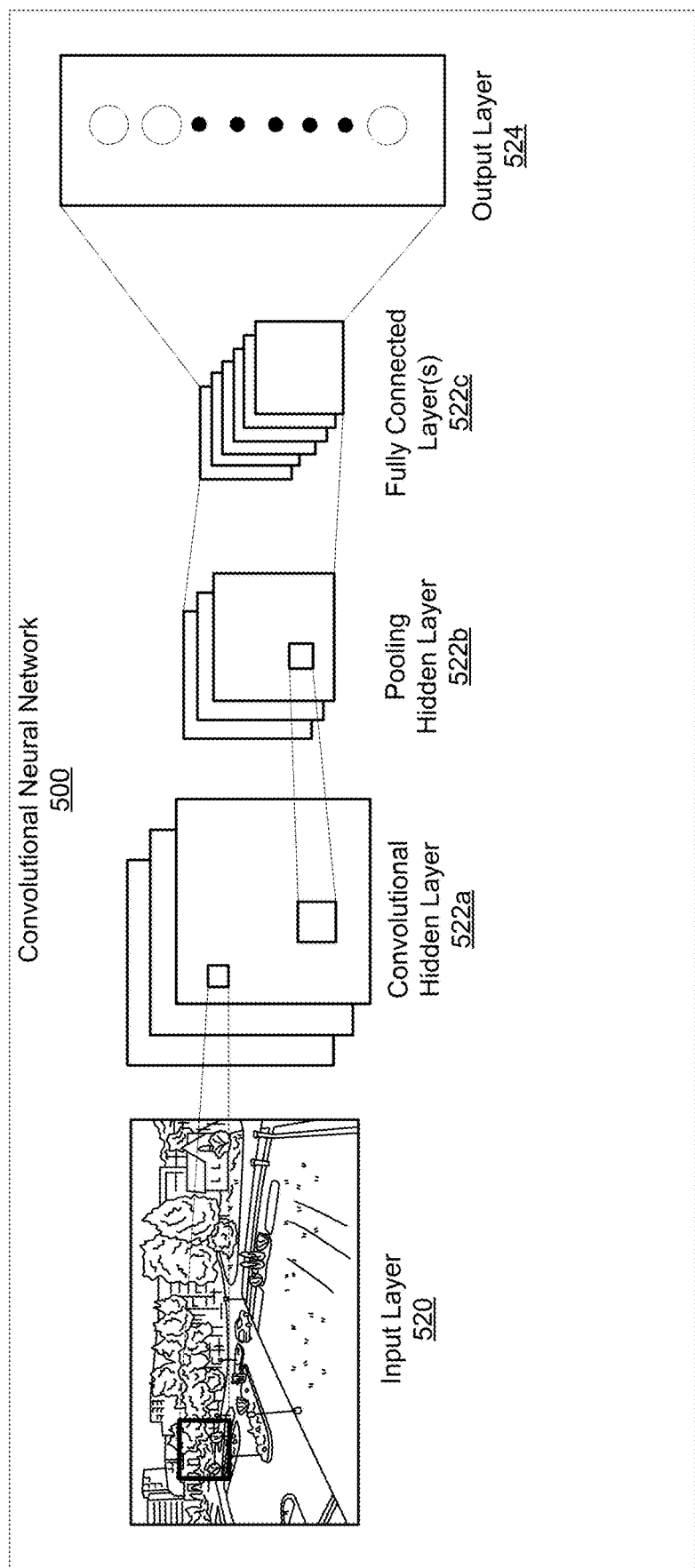
FIG. 5 is a block diagram illustrating an example of a convolutional neural network, in accordance with some examples of the present disclosure.
Figure 6:
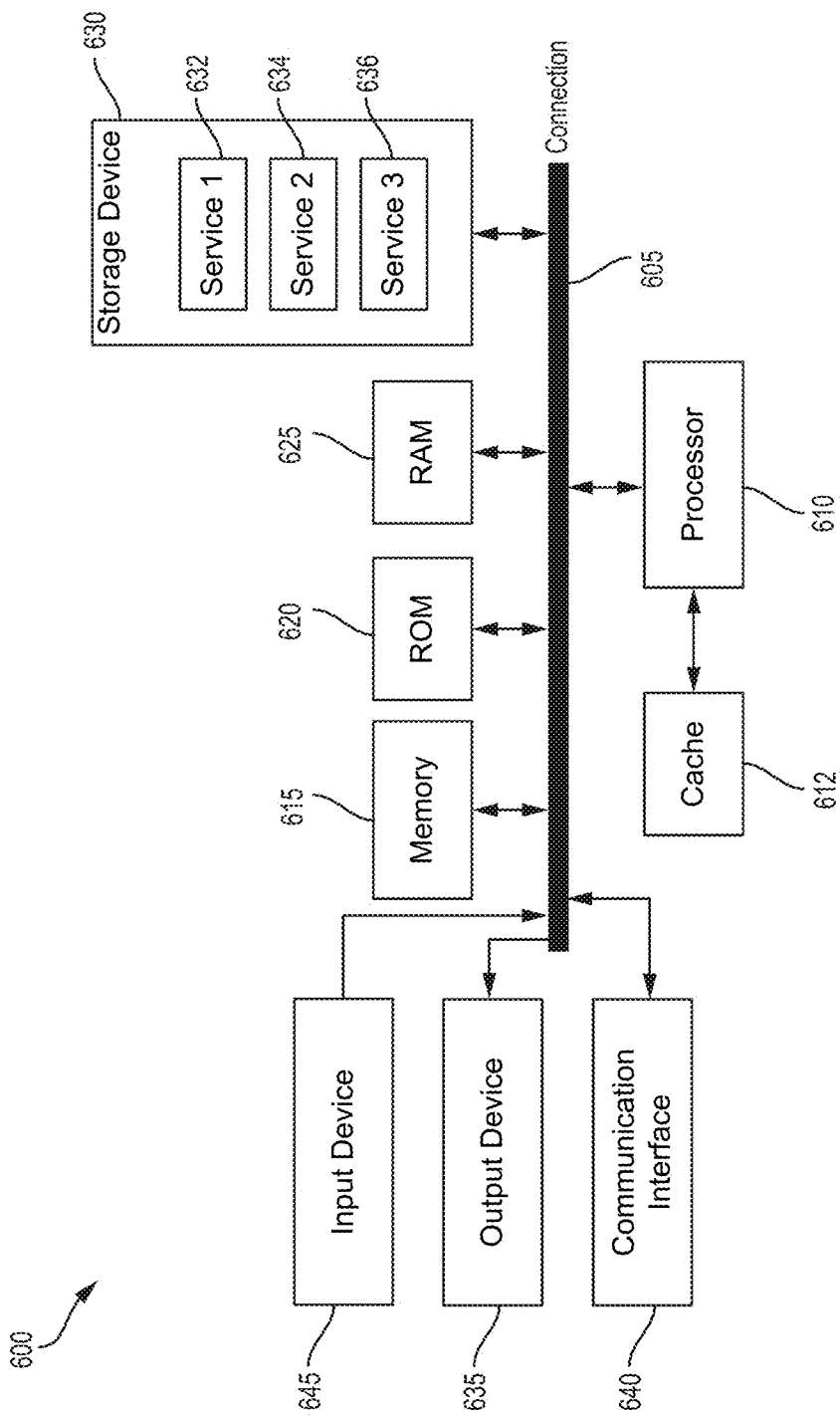
FIG. 6 is a diagram illustrating an example of a computing system for implementing certain aspects described herein.

The operations of the process 300 may be implemented as software components that are executed and run on one or more processors (e.g., the processor 610 of FIG. 6, a processor such as a DSP, GPU, NPU, etc. configured to execute a machine learning model or algorithm, such as the deep learning network 400 of FIG. 4 or the CNN 500 of FIG. 5, or other processor(s)). Further, the transmission and reception of signals by the computing device in the process 300 may be enabled, for example, by one or more antennas, one or more transceivers (e.g., wireless transceiver(s)), and/or other communication components of the computing device (e.g., the communications interface 640 of FIG. 6).

At block 302, the computing device (or component thereof) can obtain, by a conditioning engine (e.g., conditioning engine 230 of FIG. 2), a baseline model (e.g., baseline models 222 of FIG. 2) for a virtual representative.

At block 304, the computing device (or component thereof) can obtain, by the conditioning engine, one or more conditioning inputs (e.g., conditioning input 235 and/or one or more conditioning inputs from knowledge base 210 of FIG. 2), configured to condition an action in one or more multi-user experiences (e.g., from experience engine 250 of FIG. 2) of the virtual representative.

At block 306, the computing device (or component thereof) can generate, based on the baseline model and the one or more conditioning inputs configured to condition an action in one or more multi-user experiences of the virtual representative, a conditioned model (e.g., conditioned model 224 of FIG. 2) for the virtual representative.

At block 308, the computing device (or component thereof) can output the conditioned model (e.g., from representative selection engine 240 of FIG. 2) for the virtual representative.

In some examples, the computing device (or component thereof) can obtain, by the conditioning engine, additional one or more conditioning inputs (e.g., conditioning input 235 and/or one or more conditioning inputs from knowledge base 210 of FIG. 2) configured to condition an additional action in one or more multi-user experiences of an additional virtual representative; and generate, based on the baseline model and the additional one or more conditioning inputs configured to condition an action in one or more multi-user experiences of the additional virtual representative, an additional conditioned model for the additional virtual representative. In some cases, the one or more conditioning inputs and the additional one or more conditioning inputs differ with respect to at least one conditioning input. In some aspects, the virtual representative performs the action in a first multi-user experience during a first time period; and the additional virtual representative performs the additional action in a second multi-user experience during a second time period. In some examples, the first time period at least partially overlaps with the second time period. In some implementations, the action in the one or more multi-user experiences of the virtual representative includes responding to queries according to a first style. In some cases, responding to queries according to the first style includes one or more of: responding with a writing style in accordance with the conditioned model; responding with a speech pattern in accordance with the conditioned model; responding with a personality trait in accordance with the conditioned model; generating an audio output consistent with speech patterns of an individual; or generating an avatar representing one or more physical characteristics of the individual. In some examples, generating the avatar representing the one or more physical characteristics of the individual includes generating a 3D model based on the one or more physical characteristics of the individual. In some aspects, the additional action in the one or more multi-user experiences of the virtual representative includes responding to queries according to a second style, the second style different from the first style. In some cases, the virtual representative responds to a query with a first response in accordance with the conditioned model for the virtual representative. In some implementations, the additional virtual representative responds to the query with a second response in accordance with the additional conditioned model for the additional virtual representative. In some cases, the second response is different from the first response.

In some examples, the computing device (or component thereof) can obtain, by the conditioning engine, an additional baseline model for an additional virtual representative; generate an additional conditioned model configured to condition an action in one or more multi-user experiences of the additional virtual representative based on the additional baseline model and the one or more conditioning inputs configured to condition the action in one or more multi-user experiences of the virtual representative; and output the additional conditioned model for the additional virtual representative. In some cases, the action in one or more multi-user experiences of the virtual representative includes responding to queries according to a first style; and the action in the one or more multi-user experiences of the additional virtual representative includes responding to queries according to a second style, the second style different from the first style. In some implementations, the virtual representative responds to a query with a first response in accordance with the first style; and the additional virtual representative responds to the query with a second response in accordance with the second style. In some aspects, the second response is different from the first response.

In some cases, the one or more conditioning inputs configured to condition the action in one or more multi-user experiences of the virtual representative includes one or more of a meeting type of a multi-user experience, a number of multi-user experience participants, an identity of one or more multi-user experience participants in the multi-user experience, a topic of the multi-user experience, a previous experience of the virtual representative in an additional multi-user experience, or at least one key performance indicator (KPI) associated with the virtual representative.

In some examples, the virtual representative participates in a multi-user experience with at least one additional multi-user experience participant. In some implementations, the at least one additional multi-user experience participant includes a different virtual representative. In some aspects, the virtual representative is associated with a first individual, and the different virtual representative is associated with a second individual, the second individual different from the first individual. In some cases, the virtual representative responds to a query from the at least one additional multi-user experience participant. In some aspects, the at least one additional multi-user experience participant includes an avatar representing an individual participating live in the multi-user experience.

In some examples, outputting the conditioned model for the virtual representative includes storing the conditioned model for the virtual representative in a representative bank. In some cases, the conditioned model stored in the representative bank retains the conditioning for the action in one or more multi-user experiences. In some aspects, the computing device (or component thereof) can obtain, by a representative selection engine, one or more experience parameters (e.g., one or more experience parameters 247 of FIG. 2) associated with a multi-user experience; and select (e.g., by representative selection engine 240 of FIG. 2), based on the one or more experience parameters, the conditioned model for the virtual representative for participation in the multi-user experience. In some implementations, the computing device (or component thereof) can output one or more notifications during the multi-user experience. In some cases, the one or more notifications include one or more of discussion of a sensitive topic, a dispute, or a request for authorization. In some examples, the computing device (or component thereof) can generate experience data based on participation of the virtual representative in the multi-user experience. In some cases, the computing device (or component thereof) can update, based on the experience data based on participation of the virtual representative in the multi-user experience, the conditioned model for the virtual representative. In some aspects, the computing device (or component thereof) can update the conditioned model for the virtual representative. In some cases, the computing device (or component thereof) can generate, based on the baseline model, the one or more conditioning inputs configured to condition the action in one or more multi-user experiences of the virtual representative, and the experience data, a third conditioned model for the virtual representative. In some examples, the experience data includes one or more of a recording, a transcript, or a summary of the multi-user experience.

In some examples, the computing device (or component thereof) can obtain user feedback (e.g., by experience engine 250, experience review engine 260) associated with the participation of the virtual representative in the multi-user experience and storing the user feedback in a knowledge base. In some implementations, the user feedback includes one or more of highlights, lowlights, survey responses, engagement metrics, eye-tracking, or emotion detection associated with the participation of conditioned model for the virtual representative in the multi-user experience.

In some cases, an additional virtual representative participates in an additional multi-user experience with a second at least one additional multi-user experience participant. In some implementations, the computing device (or component thereof) can generate additional experience data based on participation of the additional virtual representative in the additional multi-user experience, and generate, based on at least one or more of the experience data or the additional experience data, third one or more conditioning inputs configured to condition the action in one or more multi-user experiences of the virtual representative.

In some cases, selecting the conditioned model for the virtual representative includes a manual selection from a plurality of conditioned models for the virtual representative, the plurality of conditioned models for the virtual representative including the conditioned model for the virtual representative. In some examples, selecting the conditioned model for the virtual representative includes automatically selecting the conditioned model for the virtual representative based on the one or more experience parameters. In some implementations, selecting the conditioned model for the virtual representative includes obtaining a selection from a different multi-user experience participant. In some aspects, the one or more experience parameters include one or more of a meeting type of the multi-user experience, a number of multi-user experience participants, an identity of one or more multi-user experience participants, a topic of the multi-user experience, a previous experience of the virtual representative in an additional multi-user experience, or at least one KPI associated with the virtual representative.

In some examples, the processes described herein (e.g., process 300 and/or other process described herein) may be performed by a computing device or apparatus. In one example, one or more of the processes can be performed by the virtual representative conditioning system 200 of FIG. 2. In another example, one or more of the processes can be performed by the computing system 600 shown in FIG. 6. For instance, a computing device with the computing system 600 shown in FIG. 6 can include the components of the virtual representative conditioning system 200 and can implement the operations of the process 300 of FIG. 3 and/or other process described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 300 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 300 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 300 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As noted above, various aspects of the present disclosure can use machine learning models or systems. FIG. 4 is an illustrative example of a deep learning neural network 400 that can be used to implement the machine learning based feature extraction and/or activity recognition (or classification) described above. An input layer 420 includes input data. In one illustrative example, the input layer 420 can include data representing the pixels of an input video frame. The neural network 400 includes multiple hidden layers 422a, 422b, through 422n. The hidden layers 422a, 422b, through 422n include "n" number of hidden layers, where "n" is an integer greater than or equal to one. The number of hidden layers can be made to include as many layers as needed for the given application. The neural network 400 further includes an output layer 421 that provides an output resulting from the processing performed by the hidden layers 422a, 422b, through 422n. In one illustrative example, the output layer 421 can provide a classification for an object in an input video frame. The classification can include a class identifying the type of activity (e.g., looking up, looking down, closing eyes, yawning, etc.).

The neural network 400 is a multi-layer neural network of interconnected nodes. Each node can represent a piece of information. Information associated with the nodes is shared among the different layers and each layer retains information as information is processed. In some cases, the neural network 400 can include a feed-forward network, in which case there are no feedback connections where outputs of the network are fed back into itself. In some cases, the neural network 400 can include a recurrent neural network, which can have loops that allow information to be carried across nodes while reading in input.

Information can be exchanged between nodes through node-to-node interconnections between the various layers. Nodes of the input layer 420 can activate a set of nodes in the first hidden layer 422a. For example, as shown, each of the input nodes of the input layer 420 is connected to each of the nodes of the first hidden layer 422a. The nodes of the first hidden layer 422a can transform the information of each input node by applying activation functions to the input node information. The information derived from the transformation can then be passed to and can activate the nodes of the next hidden layer 422b, which can perform their own designated functions. Example functions include convolutional, up-sampling, data transformation, and/or any other suitable functions. The output of the hidden layer 422b can then activate nodes of the next hidden layer, and so on. The output of the last hidden layer 422n can activate one or more nodes of the output layer 421, at which an output is provided. In some cases, while nodes (e.g., node 426) in the neural network 400 are shown as having multiple output lines, a node has a single output and all lines shown as being output from a node represent the same output value.

In some cases, each node or interconnection between nodes can have a weight that is a set of parameters derived from the training of the neural network 400. Once the neural network 400 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 400 to be adaptive to inputs and able to learn as more and more data is processed.

The neural network 400 is pre-trained to process the features from the data in the input layer 420 using the different hidden layers 422a, 422b, through 422n in order to provide the output through the output layer 421. In an example in which the neural network 400 is used to identify activities being performed by a driver in frames, the neural network 400 can be trained using training data that includes both frames and labels, as described above. For instance, training frames can be input into the network, with each training frame having a label indicating the features in the frames (for the feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 400 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 400 is trained well enough so that the weights of the layers are accurately tuned.

For the example of identifying objects in frames, the forward pass can include passing a training frame through the neural network 400. The weights are initially randomized before the neural network 400 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 400, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 400 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $E_{total}=\Sigma \frac{1}{2}(\text{target}-\text{output})^2$. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 400 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and η denotes a learning rate. The learning rate can be set to any suitable value, with a high learning rate including larger weight updates and a lower value indicating smaller weight updates.

The neural network 400 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 400 can include any other deep network other than a CNN, such as an autoencoder, a deep belief nets (DBNs), a Recurrent Neural Networks (RNNs), among others.

FIG. 5 is an illustrative example of a convolutional neural network (CNN) 500. The input layer 520 of the CNN 500 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 522a, an optional non-linear activation layer, a pooling hidden layer 522b, and fully connected hidden layers 522c to get an output at the output layer 524. While only one of each hidden layer is shown in FIG. 5, one of ordinary skill will appreciate that multiple convolutional hidden layers, non-linear layers, pooling hidden layers, and/or fully connected layers can be included in the CNN 500. As previously described, the output can indicate a single class of an object or can include a probability of classes that best describe the object in the image.

The first layer of the CNN 500 is the convolutional hidden layer 522a. The convolutional hidden layer 522a analyzes the image data of the input layer 520. Each node of the convolutional hidden layer 522a is connected to a region of nodes (pixels) of the input image called a receptive field. The convolutional hidden layer 522a can be considered as one or more filters (each filter corresponding to a different activation or feature map), with each convolutional iteration of a filter being a node or neuron of the convolutional hidden layer 522a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 522a. Each connection between a node and a receptive field for that node learns a weight and, in some cases, an overall bias such that each node learns to analyze its particular local receptive field in the input image. Each node of the hidden layer 522a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 522a is due to each node of the convolutional layer being applied to its corresponding receptive field. For example, a filter of the convolutional hidden layer 522a can begin in the top-left corner of the input image array and can convolve around the input image. As noted above, each convolutional iteration of the filter can be considered a node or neuron of the convolutional hidden layer 522a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 522a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 522a.

The mapping from the input layer to the convolutional hidden layer 522a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 522a can include several activation maps in order to identify multiple features in an image. The example shown in FIG. 5 includes three activation maps. Using three activation maps, the convolutional hidden layer 522a can detect three different kinds of features, with each feature being detectable across the entire image.

In some examples, a non-linear hidden layer can be applied after the convolutional hidden layer 522a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 500 without affecting the receptive fields of the convolutional hidden layer 522a.

The pooling hidden layer 522b can be applied after the convolutional hidden layer 522a (and after the non-linear hidden layer when used). The pooling hidden layer 522b is used to simplify the information in the output from the convolutional hidden layer 522a. For example, the pooling hidden layer 522b can take each activation map output from the convolutional hidden layer 522a and generates a condensed activation map (or feature map) using a pooling function. Max-pooling is one example of a function performed by a pooling hidden layer. Other forms of pooling functions be used by the pooling hidden layer 522b, such as average pooling, L2-norm pooling, or other suitable pooling functions. A pooling function (e.g., a max-pooling filter, an L2-norm filter, or other suitable pooling filter) is applied to each activation map included in the convolutional hidden layer 522a. In the example shown in FIG. 5, three pooling filters are used for the three activation maps in the convolutional hidden layer 522a.

In some examples, max-pooling can be used by applying a max-pooling filter (e.g., having a size of 2×2) with a stride (e.g., equal to a dimension of the filter, such as a stride of 2) to an activation map output from the convolutional hidden layer 522a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 522a having a dimension of 24×24 nodes, the output from the pooling hidden layer 522b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 500.

The final layer of connections in the network is a fully-connected layer that connects every node from the pooling hidden layer 522b to every one of the output nodes in the output layer 524. Using the example above, the input layer includes 28×28 nodes encoding the pixel intensities of the input image, the convolutional hidden layer 522a includes 3×24×24 hidden feature nodes based on application of a 5×5 local receptive field (for the filters) to three activation maps, and the pooling hidden layer 522b includes a layer of 3×12×12 hidden feature nodes based on application of max-pooling filter to 2×2 regions across each of the three feature maps. Extending this example, the output layer 524 can include ten output nodes. In such an example, every node of the 3×12×12 pooling hidden layer 522b is connected to every node of the output layer 524.

The fully connected layer 522c can obtain the output of the previous pooling hidden layer 522b (which should represent the activation maps of high-level features) and determines the features that most correlate to a particular class. For example, the fully connected layer 522c layer can determine the high-level features that most strongly correlate to a particular class, and can include weights (nodes) for the high-level features. A product can be computed between the weights of the fully connected layer 522c and the pooling hidden layer 522b to obtain probabilities for the different classes. For example, if the CNN 500 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 524 can include an M-dimensional vector (in the prior example, M=10). M indicates the number of classes that the CNN 500 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 6 is a diagram illustrating an example of a system for implementing certain aspects of the present technology. In particular, FIG. 6 illustrates an example of computing system 600, which can be for example any computing device making up internal computing system, a remote computing system, a camera, or any component thereof in which the components of the system are in communication with each other using connection 605. Connection 605 can be a physical connection using a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 610 and connection 605 that couples various system components including system memory 615, such as read-only memory (ROM) 620 and random access memory (RAM) 625 to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms. In some instances, multi-modal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning200 port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for conditioning virtual representatives comprising: at least one memory; and at least one processor coupled to the at least one memory and configured to: obtain, by a conditioning engine, a baseline model for a virtual representative; obtain, by the conditioning engine, one or more conditioning inputs configured to condition an action in one or more multi-user experiences of the virtual representative; generate, based on the baseline model and the one or more conditioning inputs configured to condition an action in one or more multi-user experiences of the virtual representative, a conditioned model for the virtual representative; and output the conditioned model for the virtual representative.

Aspect 2. The apparatus of Aspect 1, wherein the at least one processor is further configured to: obtain, by the conditioning engine, additional one or more conditioning inputs configured to condition an additional action in one or more multi-user experiences of an additional virtual representative; and generate, based on the baseline model and the additional one or more conditioning inputs configured to condition an action in one or more multi-user experiences of the additional virtual representative, an additional conditioned model for the additional virtual representative, wherein the one or more conditioning inputs and the additional one or more conditioning inputs differ with respect to at least one conditioning input.

Aspect 3. The apparatus of any of Aspects 1 to 2, wherein: the virtual representative performs the action in a first multi-user experience during a first time period; and the additional virtual representative performs the additional action in a second multi-user experience during a second time period, wherein the first time period at least partially overlaps with the second time period.

Aspect 4. The apparatus of any of Aspects 1 to 3, wherein the action in the one or more multi-user experiences of the virtual representative comprises responding to queries according to a first style.

Aspect 5. The apparatus of any of Aspects 1 to 4 wherein responding to queries according to the first style comprises one or more of: responding with a writing style in accordance with the conditioned model; responding with a speech pattern in accordance with the conditioned model; responding with a personality trait in accordance with the conditioned model; generating an audio output consistent with speech patterns of an individual; or generating an avatar representing one or more physical characteristics of the individual.

Aspect 6. The apparatus of any of Aspects 1 to 5, wherein generating the avatar representing the one or more physical characteristics of the individual comprises generating a 3D model based on the one or more physical characteristics of the individual.

Aspect 7. The apparatus of any of Aspects 1 to 6, wherein the additional action in the one or more multi-user experiences of the virtual representative comprises responding to queries according to a second style, the second style different from the first style.

Aspect 8. The apparatus of any of Aspects 1 to 7, wherein the virtual representative responds to a query with a first response in accordance with the conditioned model for the virtual representative.

Aspect 9. The apparatus of any of Aspects 1 to 8, wherein the additional virtual representative responds to the query with a second response in accordance with the additional conditioned model for the additional virtual representative, wherein the second response is different from the first response.

Aspect 10. The apparatus of any of Aspects 1 to 9, wherein the at least one processor is further configured to: obtain, by the conditioning engine, an additional baseline model for an additional virtual representative; generate an additional conditioned model configured to condition an action in one or more multi-user experiences of the additional virtual representative based on the additional baseline model and the one or more conditioning inputs configured to condition the action in one or more multi-user experiences of the virtual representative; and output the additional conditioned model for the additional virtual representative.

Aspect 11. The apparatus of any of Aspects 1 to 10, wherein: the action in one or more multi-user experiences of the virtual representative comprises responding to queries according to a first style; and the action in the one or more multi-user experiences of the additional virtual representative comprises responding to queries according to a second style, the second style different from the first style.

Aspect 12. The apparatus of any of Aspects 1 to 11, wherein: the virtual representative responds to a query with a first response in accordance with the first style; and the additional virtual representative responds to the query with a second response in accordance with the second style, wherein the second response is different from the first response.

Aspect 13. The apparatus of any of Aspects 1 to 12, wherein the one or more conditioning inputs configured to condition the action in one or more multi-user experiences of the virtual representative comprise one or more of a meeting type of a multi-user experience, a number of multi-user experience participants, an identity of one or more multi-user experience participants in the multi-user experience, a topic of the multi-user experience, a previous experience of the virtual representative in an additional multi-user experience, or at least one key performance indicator (KPI) associated with the virtual representative.

Aspect 14. The apparatus of any of Aspects 1 to 13, wherein the virtual representative participates in a multi-user experience with at least one additional multi-user experience participant.

Aspect 15. The apparatus of any of Aspects 1 to 14, wherein the at least one additional multi-user experience participant comprises a different virtual representative, wherein the virtual representative is associated with a first individual, and the different virtual representative is associated with a second individual, the second individual different from the first individual.

Aspect 16. The apparatus of any of Aspects 1 to 15, wherein the virtual representative responds to a query from the at least one additional multi-user experience participant.

Aspect 17. The apparatus of any of Aspects 1 to 16, wherein the at least one additional multi-user experience participant comprises an avatar representing an individual participating live in the multi-user experience.

Aspect 18. The apparatus of any of Aspects 1 to 17, wherein outputting the conditioned model for the virtual representative comprises storing the conditioned model for the virtual representative in a representative bank, wherein the conditioned model stored in the representative bank retains the conditioning for the action in one or more multi-user experiences.

Aspect 19. The apparatus of any of Aspects 1 to 18, wherein the at least one processor is further configured to: obtain, by a representative selection engine, one or more experience parameters associated with a multi-user experience; and select, based on the one or more experience parameters, the conditioned model for the virtual representative for participation in the multi-user experience.

Aspect 20. The apparatus of any of Aspects 1 to 19, wherein the at least one processor is further configured to output, by the virtual representative, one or more notifications during the multi-user experience, wherein the one or more notifications comprise one or more of discussion of a sensitive topic, a dispute, or a request for authorization.

Aspect 21. The apparatus of any of Aspects 1 to 20, wherein the at least one processor is further configured to generate experience data based on participation of the virtual representative in the multi-user experience.

Aspect 22. The apparatus of any of Aspects 1 to 21, wherein the at least one processor is further configured to update, based on the experience data based on participation of the virtual representative in the multi-user experience, the conditioned model for the virtual representative.

Aspect 23. The apparatus of any of Aspects 1 to 22, wherein the at least one processor is further configured to obtain user feedback associated with the participation of the virtual representative in the multi-user experience and storing the user feedback in a knowledge base.

Aspect 24. The apparatus of any of Aspects 1 to 23, wherein the experience data comprises one or more of a recording, a transcript, or a summary of the multi-user experience.

Aspect 25. The apparatus of any of Aspects 1 to 24, wherein the at least one processor is further configured to obtain user feedback associated with the participation of the virtual representative in the multi-user experience and storing the user feedback in a knowledge base.

Aspect 26. The apparatus of any of Aspects 1 to 25, wherein the user feedback comprises one or more of highlights, lowlights, survey responses, engagement metrics, eye-tracking, or emotion detection associated with the participation of conditioned model for the virtual representative in the multi-user experience.

Aspect 27. The apparatus of any of Aspects 1 to 26, wherein an additional virtual representative participates in an additional multi-user experience with a second at least one additional multi-user experience participant.

Aspect 28. The apparatus of any of Aspects 1 to 27, wherein the at least one processor is further configured to: generate additional experience data based on participation of the additional virtual representative in the additional multi-user experience, and generate, based on at least one or more of the experience data or the additional experience data, third one or more conditioning inputs configured to condition the action in one or more multi-user experiences of the virtual representative.

Aspect 29. The apparatus of any of Aspects 1 to 28, wherein selecting the conditioned model for the virtual representative comprises automatically selecting the conditioned model for the virtual representative based on the one or more experience parameters.

Aspect 30. The apparatus of any of Aspects 1 to 29, wherein the one or more experience parameters comprise one or more of a meeting type of the multi-user experience, a number of multi-user experience participants, an identity of one or more multi-user experience participants, a topic of the multi-user experience, a previous experience of the virtual representative in an additional multi-user experience, or at least one KPI associated with the virtual representative.

Aspect 31. The apparatus of any of Aspects 1 to 30, wherein the KPI comprises one or more of a statistical measure of desirable conflict resolutions or a statistical measure of response quality.

Aspect 32. The apparatus of any of Aspects 1 to 31, wherein selecting the conditioned model for the virtual representative comprises a manual selection from a plurality of conditioned models for the virtual representative, the plurality of conditioned models for the virtual representative comprising the conditioned model for the virtual representative.

Aspect 33. The apparatus of any of Aspects 1 to 32, wherein selecting the conditioned model for the virtual representative comprises obtaining a selection from a different multi-user experience participant.

Aspect 34. The apparatus of any of Aspects 1 to 33, wherein the baseline model comprises one or more of a generative model, a natural language processing model, a natural language generation model, a natural language understanding model, an audio processing model, an audio understanding model, an audio generation model, an image processing model, a computer vision model, an image generation model, or a multi-modal model.

Aspect 35. The apparatus of any of Aspects 1 to 34, wherein obtaining the one or more conditioning inputs comprises obtaining at least one conditioning input from a knowledge base.

Aspect 36. The apparatus of any of Aspects 1 to 35, wherein the one or more conditioning inputs comprise one or more of personal identification data, categorized emails, social media data, a user prompt, a conversation with a user, data from one or more multi-user experiences attended by the virtual representative, or data associated with one or more personal experiences of an individual.

Aspect 37. A method of conditioning virtual representatives comprising: obtaining, by a conditioning engine, a baseline model for a virtual representative; obtaining, by the conditioning engine, one or more conditioning inputs configured to condition an action in one or more multi-user experiences of the virtual representative; generating, based on the baseline model and the one or more conditioning inputs configured to condition an action in one or more multi-user experiences of the virtual representative, a conditioned model for the virtual representative; and outputting the conditioned model for the virtual representative.

Aspect 38. The method of Aspect 37, further comprising: obtaining, by the conditioning engine, additional one or more conditioning inputs configured to condition an additional action in one or more multi-user experiences of an additional virtual representative; and generating, based on the baseline model and the additional one or more conditioning inputs configured to condition an action in one or more multi-user experiences of the additional virtual representative, an additional conditioned model for the additional virtual representative, wherein the one or more conditioning inputs and the additional one or more conditioning inputs differ with respect to at least one conditioning input.

Aspect 39. The method of any of Aspects 37 to 38, wherein: the virtual representative performs the action in a first multi-user experience during a first time period; and the additional virtual representative performs the additional action in a second multi-user experience during a second time period, wherein the first time period at least partially overlaps with the second time period.

Aspect 40. The method of any of Aspects 37 to 39, wherein the action in the one or more multi-user experiences of the virtual representative comprises responding to queries according to a first style.

Aspect 41. The method of any of Aspects 37 to 40, wherein responding to queries according to the first style comprises one or more of: responding with a writing style in accordance with the conditioned model; responding with a speech pattern in accordance with the conditioned model; responding with a personality trait in accordance with the conditioned model; generating an audio output consistent with speech patterns of an individual; or generating an avatar representing one or more physical characteristics of the individual.

Aspect 42. The method of any of Aspects 37 to 41, wherein generating the avatar representing the one or more physical characteristics of the individual comprises generating a 3D model based on the one or more physical characteristics of the individual.

Aspect 43. The method of any of Aspects 37 to 42, wherein the additional action in the one or more multi-user experiences of the virtual representative comprises responding to queries according to a second style, the second style different from the first style.

Aspect 44. The method of any of Aspects 37 to 43, wherein the virtual representative responds to a query with a first response in accordance with the conditioned model for the virtual representative.

Aspect 45. The method of any of Aspects 37 to 44, wherein the additional virtual representative responds to the query with a second response in accordance with the additional conditioned model for the additional virtual representative, wherein the second response is different from the first response.

Aspect 46. The method of any of Aspects 37 to 45, further comprising: obtaining, by the conditioning engine, an additional baseline model for an additional virtual representative; generating an additional conditioned model configured to condition an action in one or more multi-user experiences of the additional virtual representative based on the additional baseline model and the one or more conditioning inputs configured to condition the action in one or more multi-user experiences of the virtual representative; and outputting the additional conditioned model for the additional virtual representative.

Aspect 47. The method of any of Aspects 37 to 46, wherein: the action in one or more multi-user experiences of the virtual representative comprises responding to queries according to a first style; and the action in the one or more multi-user experiences of the additional virtual representative comprises responding to queries according to a second style, the second style different from the first style.

Aspect 48. The method of any of Aspects 37 to 47, wherein: the virtual representative responds to a query with a first response in accordance with the first style; and the additional virtual representative responds to the query with a second response in accordance with the second style, wherein the second response is different from the first response.

Aspect 49. The method of any of Aspects 37 to 48, wherein the one or more conditioning inputs configured to condition the action in one or more multi-user experiences of the virtual representative comprise one or more of a meeting type of a multi-user experience, a number of multi-user experience participants, an identity of one or more multi-user experience participants in the multi-user experience, a topic of the multi-user experience, a previous experience of the virtual representative in an additional multi-user experience, or at least one KPI associated with the virtual representative.

Aspect 50. The method of any of Aspects 37 to 49, wherein the virtual representative participates in a multi-user experience with at least one additional multi-user experience participant.

Aspect 51. The method of any of Aspects 37 to 50, wherein the at least one additional multi-user experience participant comprises a different virtual representative, wherein the virtual representative is associated with a first individual, and the different virtual representative is associated with a second individual, the second individual different from the first individual.

Aspect 52. The method of any of Aspects 37 to 51, wherein the virtual representative responds to a query from the at least one additional multi-user experience participant.

Aspect 53. The method of any of Aspects 37 to 52, wherein the at least one additional multi-user experience participant comprises an avatar representing an individual participating live in the multi-user experience.

Aspect 54. The method of any of Aspects 37 to 53, further comprising outputting, by the virtual representative, one or more notifications during the multi-user experience, wherein the one or more notifications comprise one or more of a discussion of a sensitive topic, a dispute, or a request for authorization.

Aspect 55. The method of any of Aspects 37 to 54, further comprising generating experience data based on participation of the virtual representative in the multi-user experience.

Aspect 56. The method of any of Aspects 37 to 55, wherein the experience data comprises one or more of a recording, a transcript, or a summary of the multi-user experience.

Aspect 57. The method of any of Aspects 37 to 56, further comprising obtaining user feedback associated with the participation of the virtual representative in the multi-user experience and storing the user feedback in a knowledge base.

Aspect 58. The method of any of Aspects 37 to 57 wherein the user feedback comprises one or more of highlights, lowlights, survey responses, engagement metrics, eye-tracking, or emotion detection associated with the participation of conditioned model for the virtual representative in the multi-user experience.

Aspect 59. The method of any of Aspects 37 to 58, wherein outputting the conditioned model for the virtual representative comprises storing the conditioned model for the virtual representative in a representative bank, wherein the conditioned model stored in the representative bank retains the conditioning for the action in one or more multi-user experiences.

Aspect 60. The method of any of Aspects 37 to 59, further comprising: obtaining, by a representative selection engine, one or more experience parameters associated with a multi-user experience; and selecting, based on the one or more experience parameters, the conditioned model for the virtual representative for participation in the multi-user experience.

Aspect 61. The method of any of Aspects 37 to 60, wherein selecting the conditioned model for the virtual representative comprises automatically selecting the conditioned model for the virtual representative based on the one or more experience parameters.

Aspect 62. The method of any of Aspects 37 to 61, wherein the one or more experience parameters comprise one or more of a meeting type of the multi-user experience, a number of multi-user experience participants, an identity of one or more multi-user experience participants, a topic of the multi-user experience, a previous experience of the virtual representative in an additional multi-user experience, or at least one KPI associated with the virtual representative.

Aspect 63. The method of any of Aspects 37 to 62, wherein the KPI comprises one or more of a statistical measure of desirable conflict resolutions or a statistical measure of response quality.

Aspect 64. The method of any of Aspects 37 to 63, wherein selecting the conditioned model for the virtual representative comprises a manual selection from a plurality of conditioned models for the virtual representative, the plurality of conditioned models for the virtual representative comprising the conditioned model for the virtual representative.

Aspect 65. The method of any of Aspects 37 to 64, wherein selecting the conditioned model for the virtual representative comprises obtaining a selection from a different multi-user experience participant.

Aspect 66. The method of any of Aspects 37 to 65, wherein the baseline model comprises one or more of a generative model, a natural language processing model, a natural language generation model, a natural language understanding model, an audio processing model, an audio understanding model, an audio generation model, an image processing model, a computer vision model, an image generation model, or a multi-modal model.

Aspect 67. The method of any of Aspects 37 to 66, wherein obtaining the one or more conditioning inputs comprises obtaining at least one conditioning input from a knowledge base.

Aspect 68. The method of any of Aspects 37 to 67, wherein the one or more conditioning inputs comprise one or more of personal identification data, categorized emails, social media data, a user prompt, a conversation with a user, data from one or more multi-user experiences attended by the virtual representative, or data associated with one or more personal experiences of an individual.

Aspect 69. The method of any of Aspects 37 to 68, further comprising updating, based on the experience data based on participation of the virtual representative in the multi-user experience, the conditioned model for the virtual representative.

Aspect 70. The method of any of Aspects 37 to 69, further comprising updating, based on the baseline model, the one or more conditioning inputs configured to condition the action in one or more multi-user experiences of the virtual representative, and the experience data, a third conditioned model for the virtual representative.

Aspect 71. The method of any of Aspects 37 to 70 wherein an additional virtual representative participates in an additional multi-user experience with a second at least one additional multi-user experience participant.

Aspect 72. The method of any of Aspects 37 to 71, wherein the method further comprises: generating additional experience data based on participation of the additional virtual representative in the additional multi-user experience, and generating, based on at least one or more of the experience data or the additional experience data, third one or more conditioning inputs configured to condition the action in one or more multi-user experiences of the virtual representative.

Aspect 73: A non-transitory computer-readable storage medium having stored thereon instructions which, when executed by one or more processors, cause the one or more processors to perform any of the operations of aspects 1 to 72.

Aspect 74: An apparatus comprising means for performing any of the operations of aspects 1 to 72.

What is claimed is:

1. An apparatus for conditioning virtual representatives comprising:
   at least one memory; and
   at least one processor coupled to the at least one memory and configured to:
      obtain, by a conditioning engine, a first model for a virtual representative;
      obtain, by the conditioning engine, one or more conditioning inputs configured to condition an action in one or more experiences including the virtual representative;
      generate, based on the first model and the one or more conditioning inputs configured to condition an action in one or more experiences including the virtual representative, a conditioned model for the virtual representative;
      output the conditioned model for the virtual representative;
      obtain, by the conditioning engine, a second model for an additional virtual representative;
      generate an additional conditioned model configured to condition an action in one or more experiences including the additional virtual representative based on the second model and the one or more conditioning inputs configured to condition the action in one or more experiences including the virtual representative; and
      output the additional conditioned model for the additional virtual representative.

2. The apparatus of claim 1, wherein the at least one processor is further configured to: obtain, by the conditioning engine, additional one or more conditioning inputs configured to condition an additional action in one or more experiences of an additional virtual representative; and generate, based on the first model and the additional one or more conditioning inputs configured to condition an action in one or more experiences of the additional virtual representative, the additional conditioned model for the additional virtual representative, wherein the one or more conditioning inputs and the additional one or more conditioning inputs differ with respect to at least one conditioning input.

3. The apparatus of claim 2, wherein:
   the virtual representative performs the action in a first experience during a first time period; and
   the additional virtual representative performs the additional action in a second experience during a second time period, wherein the first time period at least partially overlaps with the second time period.

4. The apparatus of claim 2, wherein the action in the one or more experiences of the virtual representative comprises responding to queries according to a first style.

5. The apparatus of claim 4 wherein responding to queries according to the first style comprises one or more of:
   responding with a writing style in accordance with the conditioned model;
   responding with a speech pattern in accordance with the conditioned model;
   responding with a personality trait in accordance with the conditioned model;
   responding with a tailored functionality in accordance with the conditioned model;
   generating an audio output consistent with speech patterns of an individual; or generating an avatar representing one or more physical characteristics of the individual.

6. The apparatus of claim 5, wherein generating the avatar representing the one or more physical characteristics of the individual comprises generating a 3D model based on the one or more physical characteristics of the individual.

7. The apparatus of claim 4, wherein the additional action in the one or more experiences of the virtual representative comprises responding to queries according to a second style, the second style different from the first style.

8. The apparatus of claim 7, wherein the virtual representative responds to a query with a first response in accordance with the conditioned model for the virtual representative.

9. The apparatus of claim 8, wherein the additional virtual representative responds to the query with a second response in accordance with the additional conditioned model for the additional virtual representative, wherein the second response is different from the first response.

10. The apparatus of claim 1, wherein:
    the action in one or more experiences of the virtual representative comprises responding to queries according to a first style; and
    the action in the one or more experiences of the additional virtual representative comprises responding to queries according to a second style, the second style different from the first style.

11. The apparatus of claim 10, wherein:
    the virtual representative responds to a query with a first response in accordance with the first style; and
    the additional virtual representative responds to the query with a second response in accordance with the second style, wherein the second response is different from the first response.

12. The apparatus of claim 1, wherein the one or more conditioning inputs configured to condition the action in one or more experiences of the virtual representative comprise one or more of a meeting type of an experience, one or more types of functionality needed for the one or more experiences, a number of multi-user experience participants, an identity of one or more experience participants in the experience, a topic of the experience, a previous experience of the virtual representative in an additional experience, or at least one key performance indicator (KPI) associated with the virtual representative.

13. The apparatus of claim 1, wherein the virtual representative participates in an experience with at least one additional experience participant.

14. The apparatus of claim 13, wherein the at least one additional experience participant comprises a different virtual representative, wherein the virtual representative is associated with a first individual, and the different virtual representative is associated with a second individual, the second individual different from the first individual.

15. The apparatus of claim 13, wherein the virtual representative responds to a query from the at least one additional experience participant.

16. The apparatus of claim 13, wherein the at least one additional experience participant comprises an avatar representing an individual participating live in the experience.

17. The apparatus of claim 13, wherein the at least one processor is further configured to output, by the virtual representative, one or more notifications during the experience, wherein the one or more notifications comprise one or more of discussion of a sensitive topic, a dispute, or a request for authorization.

18. The apparatus of claim 13, wherein the at least one processor is further configured to generate experience data based on participation of the virtual representative in the experience.

19. The apparatus of claim 18, wherein the at least one processor is further configured to update, based on the experience data based on participation of the virtual representative in the experience, the conditioned model for the virtual representative.

20. The apparatus of claim 19, wherein, to update the conditioned model for the virtual representative, the at least one processor is configured to generate, based on the first model, the one or more conditioning inputs configured to condition the action in one or more experiences of the virtual representative, and the experience data, a third conditioned model for the virtual representative.

21. The apparatus of claim 18, wherein the experience data comprises one or more of a recording, a transcript, or a summary of the experience.

22. The apparatus of claim 18, wherein the at least one processor is further configured to obtain user feedback associated with the participation of the virtual representative in the experience and storing the user feedback in a knowledge base.

23. The apparatus of claim 22 wherein the user feedback comprises one or more of highlights, lowlights, survey responses, engagement metrics, eye-tracking, or emotion detection associated with the participation of conditioned model for the virtual representative in the experience.

24. The apparatus of claim 18, wherein an additional virtual representative participates in an additional experience with a second at least one additional experience participant.

25. The apparatus of claim 24, wherein the at least one processor is further configured to: generate additional experience data based on participation of the additional virtual representative in the additional experience, and generate, based on at least one or more of the experience data or the additional experience data, third one or more conditioning inputs configured to condition the action in one or more experiences of the virtual representative.

26. The apparatus of claim 1, wherein outputting the conditioned model for the virtual representative comprises storing the conditioned model for the virtual representative in a representative bank, wherein the conditioned model stored in the representative bank retains the conditioning for the action in one or more experiences.

27. The apparatus of claim 26, wherein the at least one processor is further configured to:
obtain, by a representative selection engine, one or more experience parameters associated with an experience; and
select, based on the one or more experience parameters, the conditioned model for the virtual representative for participation in the experience.

28. The apparatus of claim 27, wherein selecting the conditioned model for the virtual representative comprises automatically selecting the conditioned model for the virtual representative based on the one or more experience parameters.

29. The apparatus of claim 27, wherein the one or more experience parameters comprise one or more of a meeting type of the experience, a number of experience participants, an identity of one or more experience participants, a topic of the experience, a previous experience of the virtual representative in an additional experience, or at least one KPI associated with the virtual representative.

30. The apparatus of claim 26, wherein selecting the conditioned model for the virtual representative comprises a manual selection from a plurality of conditioned models for the virtual representative, the plurality of conditioned models for the virtual representative comprising the conditioned model for the virtual representative.

31. The apparatus of claim 26, wherein selecting the conditioned model for the virtual representative comprises obtaining a selection from a different experience participant.

32. A method of conditioning virtual representatives comprising:
obtaining, by a conditioning engine, a first model for a virtual representative;
obtaining, by the conditioning engine, one or more conditioning inputs configured to condition an action in one or more experiences ofincluding the virtual representative;
generating, based on the first model and the one or more conditioning inputs configured to condition an action in one or more experiences including the virtual representative, a conditioned model for the virtual representative;
outputting the conditioned model for the virtual representative;
obtaining, by the conditioning engine, a second model for an additional virtual representative;
generating an additional conditioned model configured to condition an action in one or more experiences including the additional virtual representative based on the second model and the one or more conditioning inputs configured to condition the action in one or more experiences including the virtual representative; and
outputting the additional conditioned model for the additional virtual representative.

33. The method of claim 32, further comprising:
obtaining, by the conditioning engine, additional one or more conditioning inputs configured to condition an additional action in one or more experiences of an additional virtual representative; and
generating, based on the first model and the additional one or more conditioning inputs configured to condition an action in one or more experiences of the additional virtual representative, an additional conditioned model for the additional virtual representative, wherein the one or more conditioning inputs and the additional one or more conditioning inputs differ with respect to at least one conditioning input.

34. The method of claim 33, wherein:
the virtual representative performs the action in a first experience during a first time period; and
the additional virtual representative performs the additional action in a second experience during a second time period, wherein the first time period at least partially overlaps with the second time period.

35. The method of claim 34, wherein the action in the one or more experiences of the virtual representative comprises responding to queries according to a first style.

36. The method of claim 35, further comprising generating an avatar representing one or more physical characteristics of an individual wherein generating the avatar representing the one or more physical characteristics of the individual comprises generating a 3D model based on the one or more physical characteristics of the individual.

37. The method of claim 36, wherein the additional action in the one or more experiences of the virtual representative comprises responding to queries according to a second style, the second style different from the first style.

38. The method of claim 37, wherein the virtual representative responds to a query with a first response in accordance with the conditioned model for the virtual representative.

39. The method of claim 38, wherein the additional virtual representative responds to the query with a second response in accordance with the additional conditioned model for the additional virtual representative, wherein the second response is different from the first response.

* * * * *